United States Patent [19]
Shoda et al.

[11] Patent Number: 6,133,569
[45] Date of Patent: Oct. 17, 2000

[54] THERMAL INFRARED CAMERA

[75] Inventors: Mashahiro Shoda, Gyoda; Tohru Ishizuya, Tokyo, both of Japan

[73] Assignee: Nikon Corporation, Tokyo, Japan

[21] Appl. No.: 09/050,974

[22] Filed: Mar. 31, 1998

[30] Foreign Application Priority Data

Apr. 3, 1997 [JP] Japan .................................. 9-085422

[51] Int. Cl.⁷ .................................................. G01J 5/26
[52] U.S. Cl. ........................ 250/332; 250/330; 250/334; 250/352
[58] Field of Search .................. 250/332, 330, 250/334, 352

[56] References Cited

U.S. PATENT DOCUMENTS

| | | | |
|---|---|---|---|
| 4,783,593 | 11/1988 | Noble | 250/352 |
| 4,827,130 | 5/1989 | Reno | 250/332 |
| 4,855,600 | 8/1989 | Menke | 250/332 |
| 4,862,002 | 8/1989 | Wang et al. | 250/352 |
| 5,302,830 | 4/1994 | Shivanandan | 250/342 |
| 5,371,369 | 12/1994 | Kent | 250/352 |
| 5,408,100 | 4/1995 | Gallivan | 250/352 |
| 5,420,419 | 5/1995 | Wood | 250/338.4 |
| 5,451,786 | 9/1995 | Kosai | 250/338.4 |
| 5,561,294 | 10/1996 | Iddan | 250/330 |
| 5,675,149 | 10/1997 | Wood et al. | 250/332 |
| 5,763,882 | 6/1998 | Klapper et al. | 250/332 |
| 5,763,885 | 6/1998 | Murphy et al. | 250/352 |
| 5,994,699 | 11/1999 | Akagawa | 250/332 |
| 5,994,701 | 11/1999 | Tsuchimoto | 250/351 |

*Primary Examiner*—Constantine Hannaher
*Assistant Examiner*—Otilia Gabor
*Attorney, Agent, or Firm*—Morgan, Lewis & Bockius LLP

[57] ABSTRACT

A thermal infrared camera includes a thermal infrared image pickup element with a plurality of light-receiving parts generating heat in response to incident infrared radiation. The incident infrared radiation is detected using changes in electrical characteristics of each of the plurality of light-receiving parts, an image-focusing optical system used for image pickup, and a temperature-controlled infrared radiation blocking body that has an opening for conducting infrared radiation from the image-focusing optical system to the thermal infrared image pickup element. The temperature-controlled infrared radiation blocking body is positioned around the thermal infrared image pickup element. The thermal infrared image pickup element is mounted on a first temperature control means used to control a temperature of the thermal infrared image pickup element.

28 Claims, 6 Drawing Sheets

THERMAL INFRARED CAMERA

This application claims the benefit of Japanese patent application No. 09-085422, filed Apr. 3, 1997, which is hereby incorporated by reference.

BACKGROUND OF THE INVENTION

1. Field of the Invention

The present invention relates to an infrared camera, and more particularly, to a thermal infrared camera with a thermal infrared image pickup element.

2. Discussion of the Related Art

Thermal infrared image pickup elements are well known in the art. In such pickup elements, light detectors include a temperature sensor using a thermistor and an infrared radiation absorbing layer including a silicon nitride film that is thermally coupled to the temperature sensor. The infrared radiation absorbing layer generates heat in response to incident infrared radiation, and a temperature change occurs in the temperature sensor. The temperature sensor exhibits a variation in its physical characteristics such as electrical resistance, in response to a change in temperature. The pickup element senses the variation in electrical resistance as a current change or a voltage change, and outputs an electrical signal in response to the infrared radiation.

Depending on the substance used, ferroelectric type, pyroelectric type and capacitance type temperature sensors are used in the art. Thermistors use a substance whose electrical resistivity varies with temperature. For example, vanadium oxide, polysilicon, amorphous silicon and titanium are often used as thermistor substances. Alternatively, pn junctions and Schottky junctions also may be used.

Pyroelectric type detectors are capacitors having metallic electrodes applied to opposite surfaces of the temperature-sensitive pyroelectric (usually ferroelectric) crystal. Modulated radiation incident on the detector gives rise to an alternating temperature change. Accompanying the temperature change is an alternating charge on the external electrodes. An alternating charge on the external electrodes induces current, which is proportional to the rate of temperature change.

Ferroelectric type detectors are very similar to pyroelectric type detectors, but operation of ferroelectric type detectors is based upon the temperature dependence of dielectric permittivity in ferroelectric materials. In both cases, a ferroelectric material, such as BST, is used.

Recently, capacitor type sensors have been proposed in which two electrodes face each other, and a change in a distance between the two electrodes caused by a change in temperature is sensed using a variation in capacitance.

However, in the pickup elements described above, the temperature variation generated in the light detectors is extremely small. For example, if a temperature of a physical object being imaged varies by 1° C., a resulting temperature variation in the light detector is approximately 0.005° C. Temperature resolution of the pickup element can be improved by adding a signal processing circuit following signal read-out in order to detect temperature variations in the physical object with a precision of 0.1° C. (i.e., in order to obtain a temperature resolution of 0.1° C.). However, the light detector must be temperature-controlled to within 0.005° C.

This may be easily understood by considering the fact that it is impossible to determine whether the temperature variation that is read out is due to incident infrared radiation or due to fluctuations in pickup element temperature resulting from changes in ambient temperature. Generally, therefore, an electronic cooling element is bonded to the pickup element, the temperature of the electronic cooling element is measured with a temperature sensor, and feedback control is used to keep the temperature of the pickup element stable.

Figure 7:
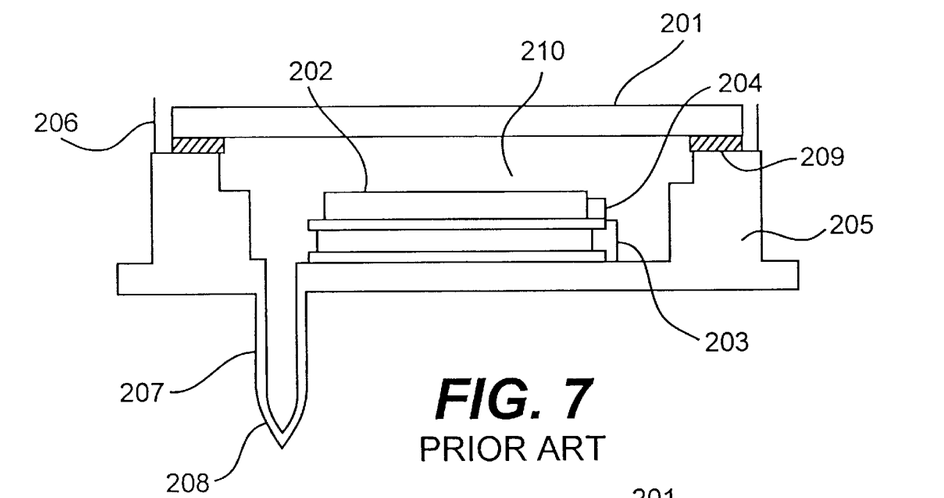
FIG. 7 is a sectional view of a conventional package used for a thermal infrared image pickup element.
Figure 8:
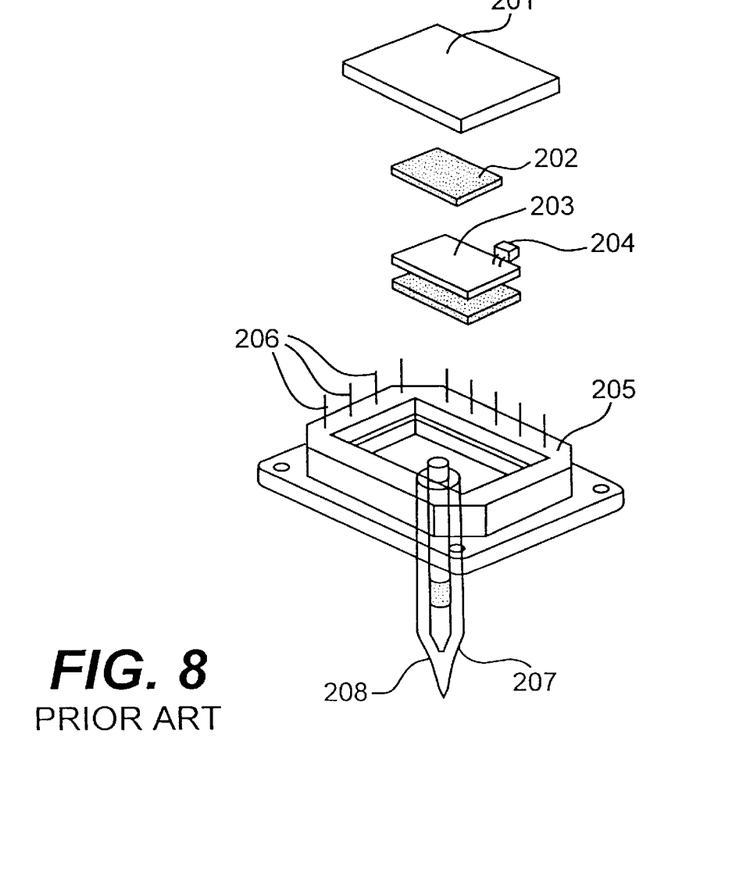
FIG. 8 is an exploded view of the conventional package shown in FIG. 7.

FIG. 7 is a sectional view of a conventional packaged sensor, and FIG. 8 is an exploded view of the conventional packaged sensor shown in FIG. 7. The conventional packaged sensor includes a main body 205 formed of a metal or a ceramic material. The conventional packaged sensor also includes a cavity (a recessed part) 210, and an infrared radiation transmission window 201. Metal piping 207 is connected to the main body 205. A thermal infrared image pickup element 202 is electrically connected to the outside via wiring 206.

The pickup element 202 is bonded to an electronic cooling element 203 used for temperature control, and is mounted in the cavity 210 together with the electronic cooling element 203. Generally, a Peltier element is used as the electronic cooling element 203. The Peltier element can cool or heat the pickup element 202 to a desired temperature depending on a polarity of applied voltage. A temperature sensor 204 is positioned near the pickup element 202 to measure the temperature of the pickup element 202.

After the electronic cooling element 203 is mounted in the main body 205, the transmission window 201 is bonded to the main body 205 with an adhesive agent 209, and the cavity 210 is evacuated via the metal piping 207 until a vacuum is attained. The metal piping 207 is then sealed by a mechanical constriction 208, completing the packaging of the pickup element 202.

Figure 9:
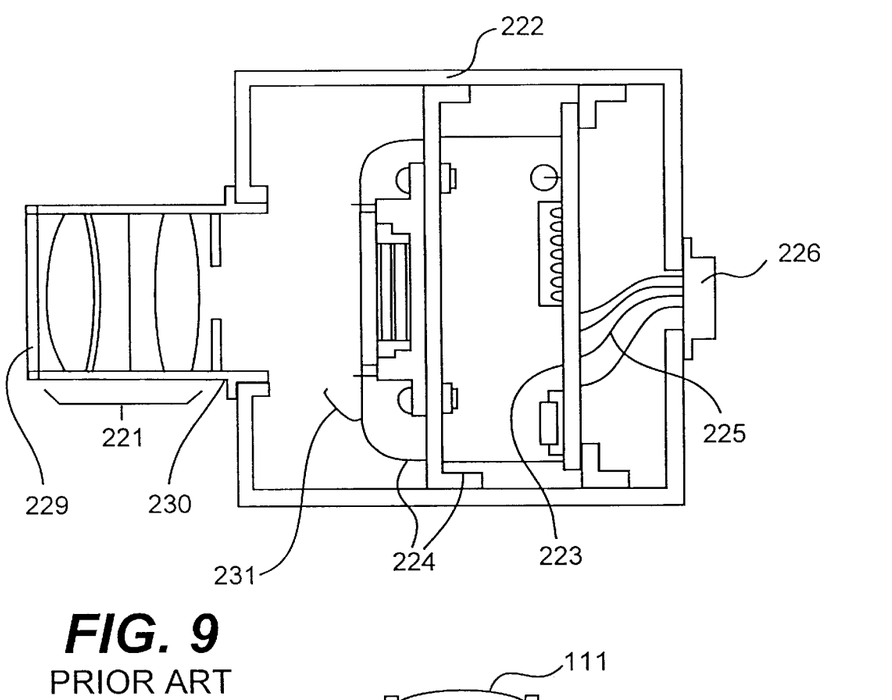
FIG. 9 is a schematic sectional view of a conventional thermal infrared camera.

Infrared cameras that use thermal infrared image pickup elements (hereafter referred to as "thermal infrared cameras") are also well known. FIG. 9 is a schematic sectional view of a conventional thermal infrared camera. A filter 229 used to limit the wavelength of incoming light is positioned before a front lens of an image-focusing optical system 221. The filter 229 may include long-pass filters and short-pass filters. The filter 229 passes only infrared radiation of a desired wavelength to the pickup element 202. Furthermore, an optically variable diaphragm 230 behind a rear lens of the image-focusing optical system 221 also is used for image pickup. The diaphragm 230 limits the amount of infrared radiation incident on the pickup element 202.

The pickup element 202 is mounted in a package 231, and the package 231 is mounted in the thermal infrared camera. If necessary, a driving and read-out circuit 223 for the pickup element 202 is installed inside the infrared camera housing 222. The package 231 and the driving and read-out circuit 223 are connected by wiring 224, and the driving and read-out circuit 223 and external circuits (not shown) are connected via wiring 225 and a connecting terminal 226.

In the conventional thermal infrared camera, the image deteriorates when the ambient temperature varies. Thus, the conventional thermal infrared camera is often impractical to use. For example, a thermal infrared camera suitable for indoor use is not suitable for outdoor use because the signal quantity for indoor use is too small and the amount of noise is too large. Moreover, if the same indoor camera is used outdoors at outside air temperatures, image quality is often poor.

As a result of research, the present inventors discovered that it is difficult to alleviate the effects of ambient temperature in the conventional thermal infrared camera merely by maintaining the temperature of the pickup element 202 at a constant value with good precision.

Specifically, the infrared radiation incident on the light detector of the pickup element 202 includes infrared radiation ("signal component") used to obtain the image that passes through the image-focusing optical system 221 used for image pickup as well as infrared radiation ("background light" or noise) that is not needed in order to obtain an image from the thermal infrared camera itself.

The background light is radiated from all the elements within a range viewed by the light detector of the pickup element 202 (e.g., the camera housing 222, a lens barrel (lens housing), the filter 229, and the package 231). These elements radiate infrared radiation due to their respective temperatures and emissivities. If infrared energy radiated by a black body at a certain temperature is taken as 1, the emissivity is a proportion of the infrared energy radiated by a certain physical body at the same temperature as the black body. At least a portion of the infrared energy is incident on the light detector of the pickup element 202 as the background light.

Accordingly, if the ambient air temperature changes, the temperatures of the elements, such as the lens barrel and the camera housing 222 also change in response to the ambient air temperature. Consequently, the background light fluctuates, and the amount of infrared radiation received by the pickup element 202 also fluctuates.

Furthermore, if the ambient air temperature increases, the background light from the Peltier element also increases. When the ambient air temperature changes, a load on the Peltier element also changes, so that a temperature of a secondary side of the Peltier element (i.e., a side opposite the pickup element 202) varies greatly. As a result, the amount of infrared radiation from the secondary side of the Peltier element also varies greatly, and the amount of the background light varies greatly as well.

Thus, in conventional thermal infrared cameras, it has been difficult to reduce the effects of ambient air temperature merely by maintaining the temperature of the pickup element 202 at a constant value with good precision.

SUMMARY OF THE INVENTION

Accordingly, the present invention is directed to a thermal infrared camera that substantially obviates one or more of the problems and limitations of the related art.

An object of the present invention is to provide a thermal infrared camera that obtains good images despite changes in ambient temperature.

Additional features and advantages of the present invention will be set forth in the description which follows, and will be apparent from the description, or may be learned by practice of the invention. The objectives and other advantages of the invention will be realized and attained by the structure and process particularly pointed out in the written description as well as in the appended claims.

To achieve these and other advantages and in accordance with the purpose of the present invention, as embodied and broadly described, in accordance with a first aspect of the present invention there is provided a thermal infrared camera including a thermal infrared image pickup element having a plurality of light-receiving parts generating heat in response to incident infrared radiation, wherein the incident infrared radiation is detected using changes in electrical characteristics of each of the plurality of light-receiving parts, an image-focusing optical system used for image pickup, and a temperature-controlled infrared radiation blocking body having an opening for conducting infrared radiation from the image-focusing optical system to the thermal infrared image pickup element and positioned around the thermal infrared image pickup element, wherein the thermal infrared image pickup element is mounted on a first temperature control means used to control a temperature of the thermal infrared image pickup element.

In another aspect of the present invention, there is provided a thermal infrared camera including a housing, a vacuum vessel positioned inside the housing and enclosing a thermal infrared image pickup element and an infrared radiation blocking body, wherein the infrared radiation blocking body partially encloses the thermal infrared image pickup element, an optical imaging system for projecting an image onto the thermal infrared image pickup element, and a temperature control element for controlling a temperature of the thermal infrared image pickup element in response to a temperature detector positioned near the thermal infrared image pickup element.

In another aspect of the present invention there is provided a thermal infrared camera including a housing, a vacuum vessel positioned inside the housing and enclosing a thermal infrared image pickup element and an infrared radiation blocking body, wherein the infrared radiation blocking body partially encloses the thermal infrared image pickup element, an optical imaging system for projecting an image onto the thermal infrared image pickup element, and a temperature control element for controlling a temperature of the thermal infrared image pickup element and the temperature-controlled infrared radiation blocking body in response to a temperature detector positioned near the thermal infrared image pickup element, wherein the optical imaging system is aperture matched to the thermal infrared pickup element.

In another aspect of the present invention there is provided a thermal infrared camera including a housing, a vacuum vessel positioned inside the housing and enclosing a thermal infrared image pickup element and an infrared radiation blocking body, wherein the infrared radiation blocking body partially encloses the thermal infrared image pickup element, an optical imaging system for projecting an image onto the thermal infrared image pickup element, and a first temperature control element for controlling a temperature of the thermal infrared image pickup element in response to a temperature detector positioned near the thermal infrared image pickup element, and a second temperature control element for controlling a temperature of the temperature-controlled infrared radiation blocking body.

In another aspect of the present invention there is provided a thermal infrared camera including a housing, a vacuum vessel positioned inside the housing and enclosing a thermal infrared image pickup element and an infrared radiation blocking body, wherein the infrared radiation blocking body partially encloses the thermal infrared image pickup element, an optical imaging system for projecting an image onto the thermal infrared image pickup element, a first Peltier element for controlling a temperature of the thermal infrared image pickup element in response to a temperature detector positioned near the thermal infrared image pickup element, and a second Peltier element for controlling a temperature of the temperature-controlled infrared radiation blocking body, wherein portions of the second Peltier element are installed over the first Peltier element, and wherein the optical imaging system is aperture matched to the thermal infrared pickup element.

In another aspect of the present invention there is provided a thermal infrared camera including a housing, a vacuum vessel positioned inside the housing and enclosing a thermal infrared image pickup element and an infrared radiation blocking body having extensions for blocking stray light, wherein the infrared radiation blocking body partially encloses the thermal infrared image pickup element, an optical imaging system for projecting an image onto the thermal infrared image pickup element, a first Peltier element for controlling a temperature of the thermal infrared image pickup element in response to a temperature detector positioned near the thermal infrared image pickup element, and a second Peltier element for controlling a temperature of the temperature-controlled infrared radiation blocking body, wherein portions of the second Peltier element are installed over the first Peltier element.

In another aspect of the present invention there is provided a thermal infrared camera including a housing, a vacuum vessel positioned inside the housing and enclosing a thermal infrared image pickup element and an infrared radiation blocking body, wherein the infrared radiation blocking body partially encloses the thermal infrared image pickup element, an optical imaging system for projecting an image onto the thermal infrared image pickup element, and a temperature control element for controlling a temperature of the thermal infrared image pickup element and the temperature-controlled infrared radiation blocking body in response to a temperature detector positioned near the thermal infrared image pickup element, and an optical filter positioned between the optical imaging system and the thermal infrared image pickup element, the optical filter including at least one of a neutral density filter, a low-pass filter, a band-pass filter, and a high-pass filter, wherein the optical filter is thermally coupled to the infrared radiation blocking body.

In another aspect of the present invention there is provided a thermal infrared camera including a housing, a vacuum vessel positioned inside the housing and enclosing a thermal infrared image pickup element and an infrared radiation blocking body, wherein the infrared radiation blocking body partially encloses the thermal infrared image pickup element, an optical imaging system for projecting an image onto the thermal infrared image pickup element, and a temperature control element for controlling a temperature of the thermal infrared image pickup element and the temperature-controlled infrared radiation blocking body in response to a temperature detector positioned near the thermal infrared image pickup element, and a variable diaphragm positioned between the optical imaging system and the thermal infrared image pickup element, wherein the variable diaphragm is thermally coupled to the infrared radiation blocking body, wherein the optical imaging system is optionally aperture matched to the thermal infrared pickup element.

In another aspect of the present invention there is provided a thermal infrared camera including a housing, a vacuum vessel positioned inside the housing and enclosing a thermal infrared image pickup element and an infrared radiation blocking body, wherein the infrared radiation blocking body partially encloses the thermal infrared image pickup element, an optical imaging system for projecting an image onto the thermal infrared image pickup element, a temperature control element for controlling a temperature of the thermal infrared image pickup element and the infrared radiation blocking body in response to a temperature detector positioned near the thermal infrared image pickup element, an optical filter positioned between the optical imaging system and the thermal infrared image pickup element, the optical filter including at least one of a neutral density filter, a low-pass filter, a band-pass filter, and a high-pass filter, wherein the optical filter is thermally coupled to the infrared radiation blocking body, and an optional variable diaphragm positioned between the optical imaging system and the thermal infrared image pickup element, wherein the optional variable diaphragm is thermally coupled to the infrared radiation blocking body, wherein the temperature control element includes a plurality of Peltier elements, wherein each of the plurality of Peltier elements includes a different number of stages, and wherein the infrared radiation blocking body is controlled to a different temperature from the thermal infrared image pickup element.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention that together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
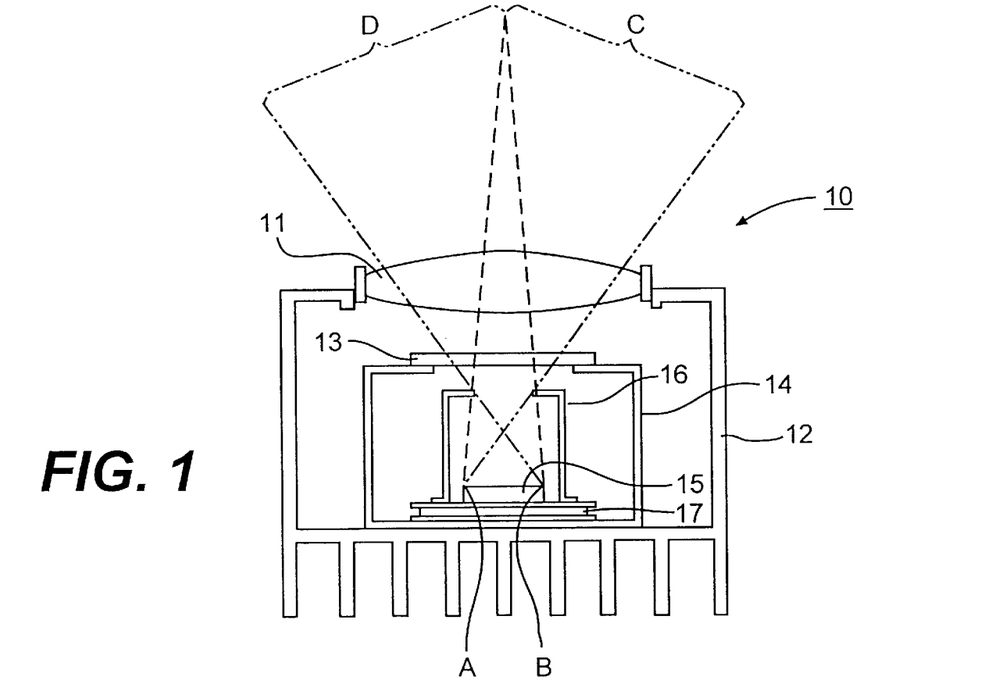
FIG. 1 is a schematic sectional view of a thermal infrared camera of a first preferred embodiment.

FIG. 1 is a schematic sectional diagram according to a first embodiment of the present invention. A thermal infrared camera 10 of the first embodiment has a housing 12 and lens 11 used as an image-focusing optical system for image pickup. A vacuum vessel 14 includes an infrared radiation transmission window 13. A thermal infrared image pickup element 15, an infrared radiation blocking body 16 (sometimes referred to as a "cold shield"), and a Peltier element 17, which acts as a temperature control element, are all positioned within the housing 12. A driving and read-out circuit (not shown) for the pickup element 15 is also positioned inside the housing 12. The pickup element 15 is connected to an external power supply and monitor wiring via a connecting terminal in the housing 12.

An inside surface of the infrared radiation blocking body 16 (i.e., a surface on a side of the pickup element 15) is coated with a black-body paint in order to lower its infrared reflectivity. Therefore, infrared radiation not needed for imaging is not incident on a light detector of the pickup element 15 after being reflected from the inside surface of the infrared radiation blocking body 16. It is also possible to lower the infrared reflectivity by using surface texturing on the infrared radiation blocking body 16.

A transmission-type lens 11 is used as the image-focusing optical system for image pickup. However, it is also possible to use a reflecting mirror, or an interference lens.

The infrared radiation blocking body 16 and the pickup element 15 are mounted on the Peltier element 17 that is controlled to a desired temperature. Both the infrared radiator block body 16 and pickup element 15 are thermally coupled to the Peltier element 17.

A temperature sensor for measuring a temperature of the pickup element 15 is mounted on the pickup element 15, and current and voltage applied to the Peltier element 17 are controlled on the basis of data from the temperature sensor.

The infrared radiation blocking body 16 covers the pickup element 15. Accordingly, background light from elements of the thermal infrared camera 10 is blocked by the infrared radiation blocking body 16. Furthermore, since the infrared radiation blocking body 16 is controlled to the desired temperature by the Peltier element 17, the amount of infrared radiation radiated by the infrared radiation blocking body 16 and incident on the pickup element 15 corresponds to the desired temperature even if the ambient temperature should vary. Accordingly, there is little fluctuation in the background light, and stable images can be obtained.

Furthermore, the infrared radiation blocking body 16 is temperature-controlled by the same Peltier element 17 used for temperature control of the thermal infrared image pickup element 15. Accordingly, construction of the thermal infrared camera 10 is simplified, and the thermal infrared camera 10 is compact and inexpensive.

In the thermal infrared camera 10 of the first embodiment, an aperture of the lens 11 is matched with the pickup element 15. For purposes of comparison, a conventional construction without 100% cold stop efficiency (aperture matching) is shown in FIG. 10.

Figure 10:
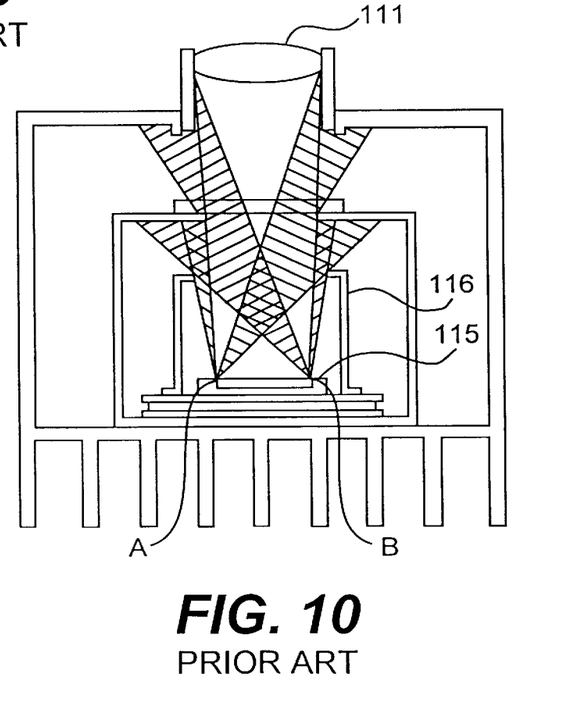
FIG. 10 is a sectional view of a conventional thermal infrared camera without 100% cold stop efficiency (aperture matching).

In the conventional camera shown in FIG. 10 (with no aperture matching), when the lens 111 is viewed from the edges A and B of the image area of the thermal infrared image pickup element 115, a field of view obtained by taking a difference between a field of view facing the lens 111 and a field of view facing the temperature-controlled infrared radiation blocking body 116 (i.e., shaded areas in FIG. 10) includes a view of elements whose temperature varies as a result of variation in the ambient temperature (e.g., a vacuum vessel, a housing of a pickup device and a lens barrel, etc.). In other words, background light from constituent elements of the conventional camera that are not temperature-controlled is incident on the pickup element 115. Accordingly, when background light from these constituent elements is incident on the pickup element 115, the background light fluctuates in response to variations in the ambient temperature, and a poor image often results.

Furthermore, the term "vacuum" refers to a degree of vacuum of 0.1 mTorr to 0.01 mTorr, which can easily be achieved and can allow heat transfer via air to be ignored.

In the thermal infrared camera 10 of the first embodiment shown in FIG. 1, the lens 11 is aperture-matched with the pickup element 15. Specifically, when the lens 11 is viewed from edges A and B of an image area of the pickup element 15, regions C and D are observed, so that no infrared radiation other than that from the lens 11 and from the infrared radiation transmission window 13, i.e., from elements that are not temperature-controlled, is incident on the image area of the pickup element 15. Accordingly, the infrared radiation incident on the image area of the pickup element 15 includes only the background light from the temperature-controlled infrared radiation blocking body 16 and the infrared radiation incident from the lens 11. The amount of the infrared radiation from the infrared radiation blocking body 16 is fixed, which means that the amount of background light is fixed. Accordingly, the ambient temperature dependence of the thermal infrared camera 10 is reduced. Furthermore, eclipsing does not occur, and the field of view of the pickup element 15 is maximized.

Furthermore, the infrared radiation blocking body 16 and the pickup element 15 are installed in the same vacuum vessel 14. Thus, the infrared radiation blocking body 16 and pickup element 15 are thermally isolated from objects outside the vacuum vessel 14. Consequently, stability of the temperature control of the thermal infrared camera 10 can be improved, and running costs of this temperature control can be reduced.

In the first preferred embodiment, electronic cooling with the Peltier element 17 is used to control the temperature. However, it is also possible to use a combination of a gas cooler and a thermoelectric heater.

If temperature control is applied to the infrared radiation blocking body 16 and the pickup element 15, stability of the temperature control can be improved. Moreover, the energy required for control can be minimized if the infrared radiation blocking body 16 and pickup element 15 are inside the same vacuum vessel and thermally isolated by means of a vacuum.

Figure 2:
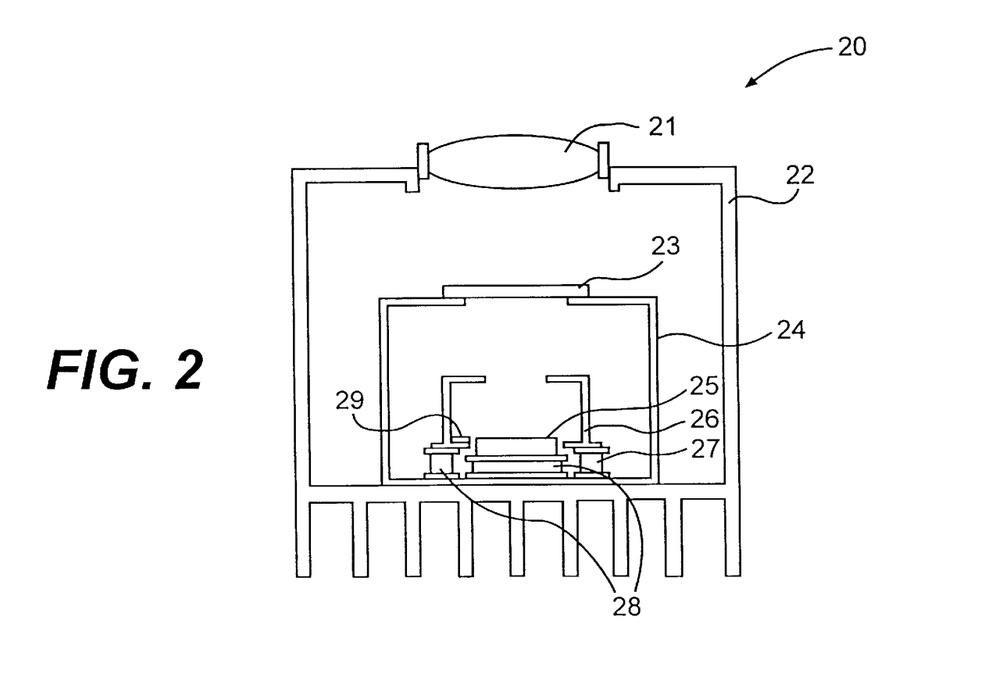
FIG. 2 is a schematic sectional view of a thermal infrared camera of a second preferred embodiment.

FIG. 2 is a schematic sectional diagram of a thermal infrared camera 20 according to a second preferred embodiment of the present invention. The second embodiment is similar to the first embodiment in having a housing 22 in which a lens 21 is positioned. A vacuum vessel 24 includes an infrared radiation transmission window 23, a pickup element 25, an infrared radiation blocking body 26, and a Peltier element 27 for controlling a temperature of the pickup element 25. Accordingly, a description of these elements is omitted. The thermal infrared camera 20 of the second preferred embodiment differs from the first embodiment in having a second Peltier element 28 for use as a second temperature control means. The infrared radiation blocking body 26 is thermally coupled to the second Peltier element 28.

Temperature sensors are mounted on the pickup element 25 and the infrared radiation blocking body 26, and currents or voltages applied to the Peltier elements 27 and 28 are controlled in response to data from the temperature sensors.

The infrared radiation blocking body 26 is temperature-controlled by the second Peltier element 28. Therefore, the infrared radiation blocking body 26 can be controlled to a different temperature from the pickup element 25. If the second Peltier element 28 has a lower temperature than the first Peltier element 27 so that the infrared radiation blocking body 26 has a lower temperature than the pickup element 25, the infrared radiation blocking body 26 can further reduce the background light. Accordingly, signal to noise ratio of the thermal infrared camera 20 is further improved.

An extension 29 of the infrared radiation blocking body 26 prevents the incidence of stray light components from secondary sides of the first Peltier element 27 and second Peltier element 28 on the pickup element 25.

Figure 3:
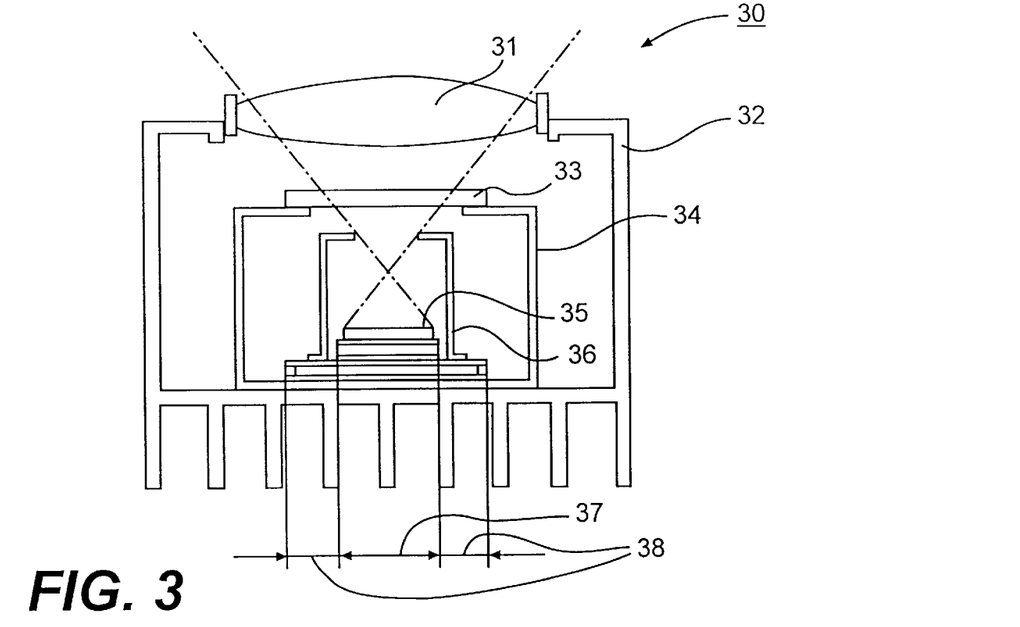
FIG. 3 is a schematic sectional view of a thermal infrared camera of a third preferred embodiment.

FIG. 3 is a schematic sectional diagram of a thermal infrared camera 30 according to a third preferred embodiment of the present invention. The third embodiment is similar to the second embodiment in having a housing 32 in which a lens 31 is positioned. A vacuum vessel 34 includes an infrared radiation transmission window 33, a pickup element 35, an infrared radiation blocking body 36, a first temperature control means 37 for controlling a temperature of the pickup element 35, and a second temperature control means 38 for controlling a temperature of the infrared radiation blocking body 36.

The thermal infrared camera 30 of the third preferred embodiment differs from the second preferred embodiment in that portions of the same Peltier element are used in common by the first and second temperature control means 37, 38, with a small additional Peltier element installed over the larger Peltier element. Also, the lens 31 is aperture-matched with the pickup element 35. The aperture matching is similar to that in the first embodiment.

When using electronic cooling elements such as Peltier elements, ultimate cooling temperature or ultimate heating temperature can be further decreased or increased by superimposing a plurality of stages. Accordingly, the thermal infrared camera 30 of the third preferred embodiment can be used at more severe ambient temperatures.

Furthermore, the ultimate heating temperature of the first temperature control means 37 is higher than that of the second temperature control means 38. Accordingly, if the first and second temperature control means 37, 38 are set at higher temperatures than the ambient temperature, the pickup element 35 can be controlled to a higher temperature than the infrared radiation blocking body 36. In other words, the infrared radiation blocking body 36 can be controlled to a lower temperature than the pickup element 35, and the infrared radiation blocking body 36 can further reduce the background light. Thus, signal to noise ratio of the thermal infrared camera 30 is further improved.

Furthermore, with the first and second temperature control means 37, 38 constructed as described above, an infrared radiation blocking body 36 that has a relatively large thermal capacity can be temperature-controlled by means of a Peltier element with a large temperature controlling capacity. Thus, large ambient temperature fluctuations can be handled.

The first temperature control means 37 includes two stages, and the second temperature control means 38 includes a single stage. However, the first and second temperature control means 37, 38 may have any number of stages, as long as a different number of stages is used.

Figure 4:
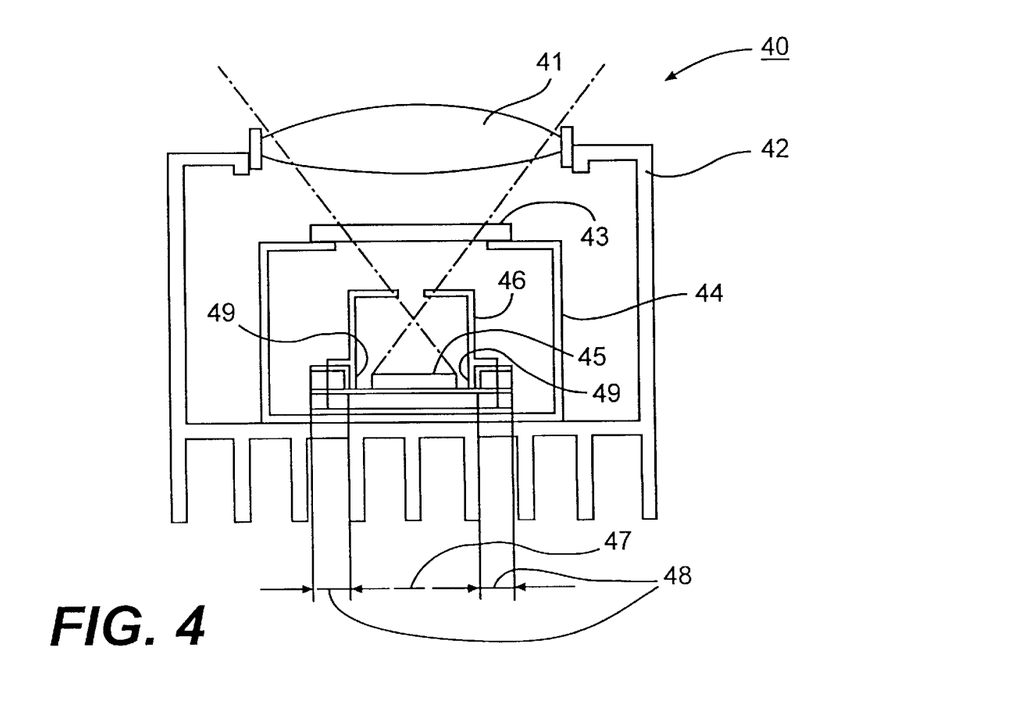
FIG. 4 is a schematic sectional view of a thermal infrared camera of a fourth preferred embodiment.

FIG. 4 illustrates a fourth preferred embodiment. In a thermal infrared camera 40 of the fourth preferred embodiment, portions of the same Peltier element are used in common by first and second temperature control means 47, 48, similar to the thermal infrared camera 30 shown in FIG. 3. Unlike the third preferred embodiment, however, an extra circular-shaped Peltier element is added to the larger Peltier element. The thermal infrared camera 40 is also suitable for use at more severe ambient temperatures if the first and second temperature control means 47, 48 are constructed as described above.

Furthermore, ultimate cooling temperature of the second temperature control means 48 is lower than that of the first temperature control means 47. Accordingly, if the first and second temperature control means 47, 48 are set for temperatures lower than the ambient temperature, an infrared radiation blocking body 46 can be controlled to a lower temperature than the thermal infrared image pickup element 45. If such a temperature control is used, the infrared radiation blocking body 46 can further reduce the background light. Thus, signal to noise ratio of the thermal infrared camera 40 is further improved.

Furthermore, extensions 49 are added to the infrared radiation blocking body 46. The extensions 49 prevent stray light components from the secondary side of the second temperature control means 48 from being incident on the pickup element 45.

Figure 5:
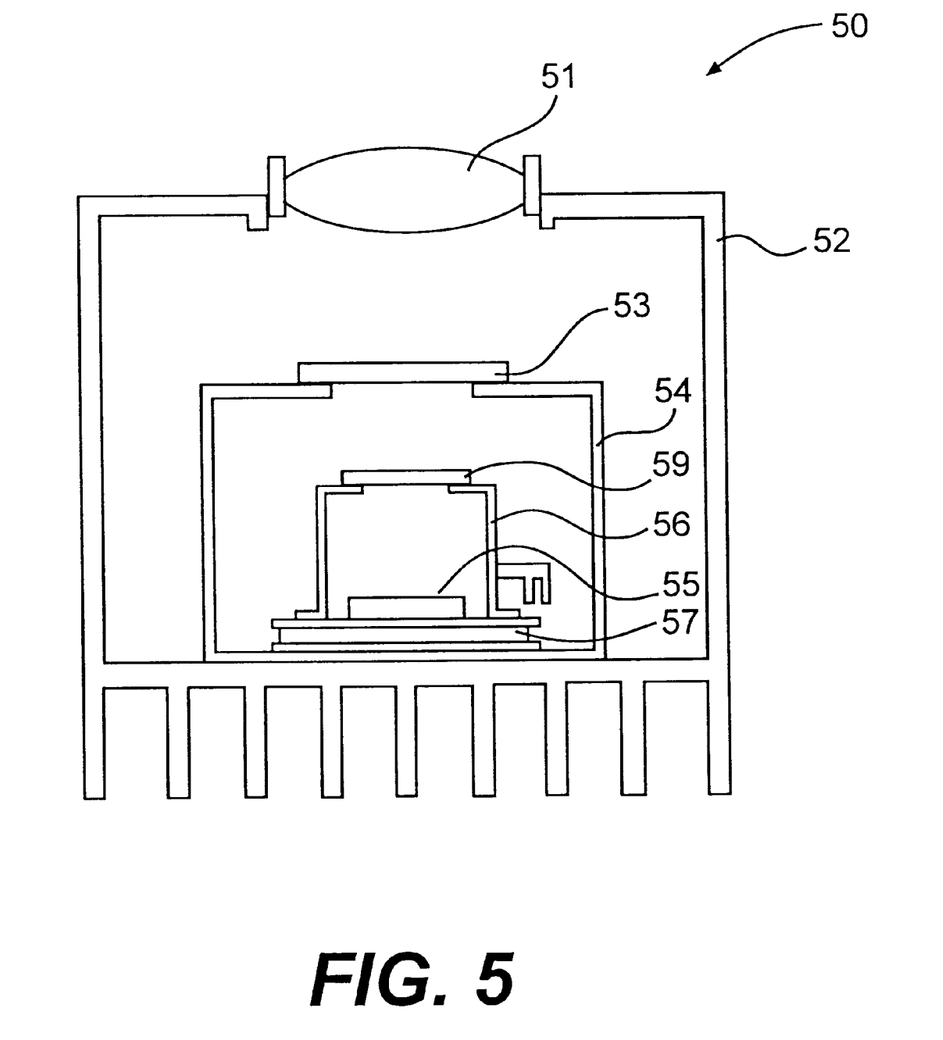
FIG. 5 is a schematic sectional view of a thermal infrared camera of a fifth preferred embodiment.

FIG. 5 is a schematic sectional diagram of a thermal infrared camera 50 according to a fifth preferred embodiment of the present invention. The fifth preferred embodiment is similar to the first preferred embodiment in having a housing 52 in which a lens 51 is positioned, a vacuum vessel 54 with an infrared radiation transmission window 53, a thermal infrared image pickup element 55, an infrared radiation blocking body 56, and a Peltier element 57 for controlling a temperature of the pickup element 55.

The thermal infrared camera 50 of the fifth embodiment differs from the first embodiment in having a neutral density (ND) filter 59 that is thermally coupled to the infrared radiation blocking body 56. Specifically, a periphery of the ND filter 59 adheres tightly to the infrared radiation blocking body 56 and covers an opening in the infrared radiation blocking body 56.

The ND filter 59 is temperature-controlled by the Peltier element 57 via the infrared radiation blocking body 56. Accordingly, the amount of infrared radiation from the ND filter 59 can be set. As a result, even if the ambient temperature around the thermal infrared camera 50 varies, fluctuations in the background light can be reduced.

A similar effect can be obtained by mounting a wavelength-limiting filter, such as a short-pass filter or long-pass filter, as long as such filters are temperature-controlled. Wavelength-limiting filters for infrared use include multi-layer films combining $SiO_2$, Ge, and ZnS.

Furthermore, easy filter replacement can be achieved by installing a plurality of individual filters on a rotating plate, and causing individual filters to adhere tightly to the infrared radiation blocking body after rotating the plate. Accordingly, wavelength range and amount of light reduction can be altered at will.

The thermal infrared camera 50 of the fifth embodiment does not have aperture matching. However, if the lens 51 is aperture-matched with the pickup element 55, fluctuations in background light incident on the pickup element 55 can be reduced. Accordingly, ambient temperature dependence of the thermal infrared camera 50 can be further reduced, and a field of view of the pickup element 55 can be maximized.

Furthermore, the term "wavelength-limiting filter" refers to a filter whose transmissivity varies with wavelength. Such filters include filters that transmit only wavelengths that are shorter than a first wavelength A (hereafter referred to as "short-pass filters"), filters that transmit light only between a first wavelength A and a second specified B within an infrared wavelength range (hereafter referred to as "band-pass filters"), and filters that transmit only wavelengths that are longer than a first wavelength A (hereafter referred to as "long-pass filters"). Such filters are sometimes referred to as a low-pass filter, a band-pass filter, and a high-pass filter.

The term "ND filter" refers to a filter that is used in order to reduce the amount of light. Generally, a filter in which the light reduction rate has little wavelength dependence in the wavelength region used is desirable. Furthermore, wavelength-limiting filters and ND filters include filters that can be removed and replaced.

It is desirable in some cases to have the wavelength-limiting filter or the ND filter 59 be mounted in the thermal infrared camera 50. This is due to the requirement that objects be observed at specified wavelengths, and that objects can be observed at a high temperature. However, the wavelength-limiting filters radiate infrared radiation corresponding to the temperature of the filters at wavelengths outside the transmission wavelength band, and in the case of the ND filter 59, infrared radiation corresponding to the temperature of the ND filter 59 is radiated across a broad wavelength band. It may be predicted that this infrared radiation will constitute a background light. However, since these filters are installed in the opening of the infrared radiation blocking body 59, the background light produced by these filters is not eliminated by the infrared radiation blocking body 59. In particular, the pickup element 55 in principle has no wavelength selectivity, and is therefore sensitive to infrared radiation at all wavelengths. Accordingly, susceptibility to effects of infrared radiation from these filters is greater than in a quantum type infrared image pickup element.

The temperature of the ND filter 59 and the quantity of infrared radiation radiated from the ND filter 59 can be fixed. Accordingly, even if the ambient temperature of the thermal infrared camera 50 with the ND filter 59 should vary, fluctuations in the background light can be reduced, and the thermal infrared camera 50 has stable image reproducibility.

Figure 6:
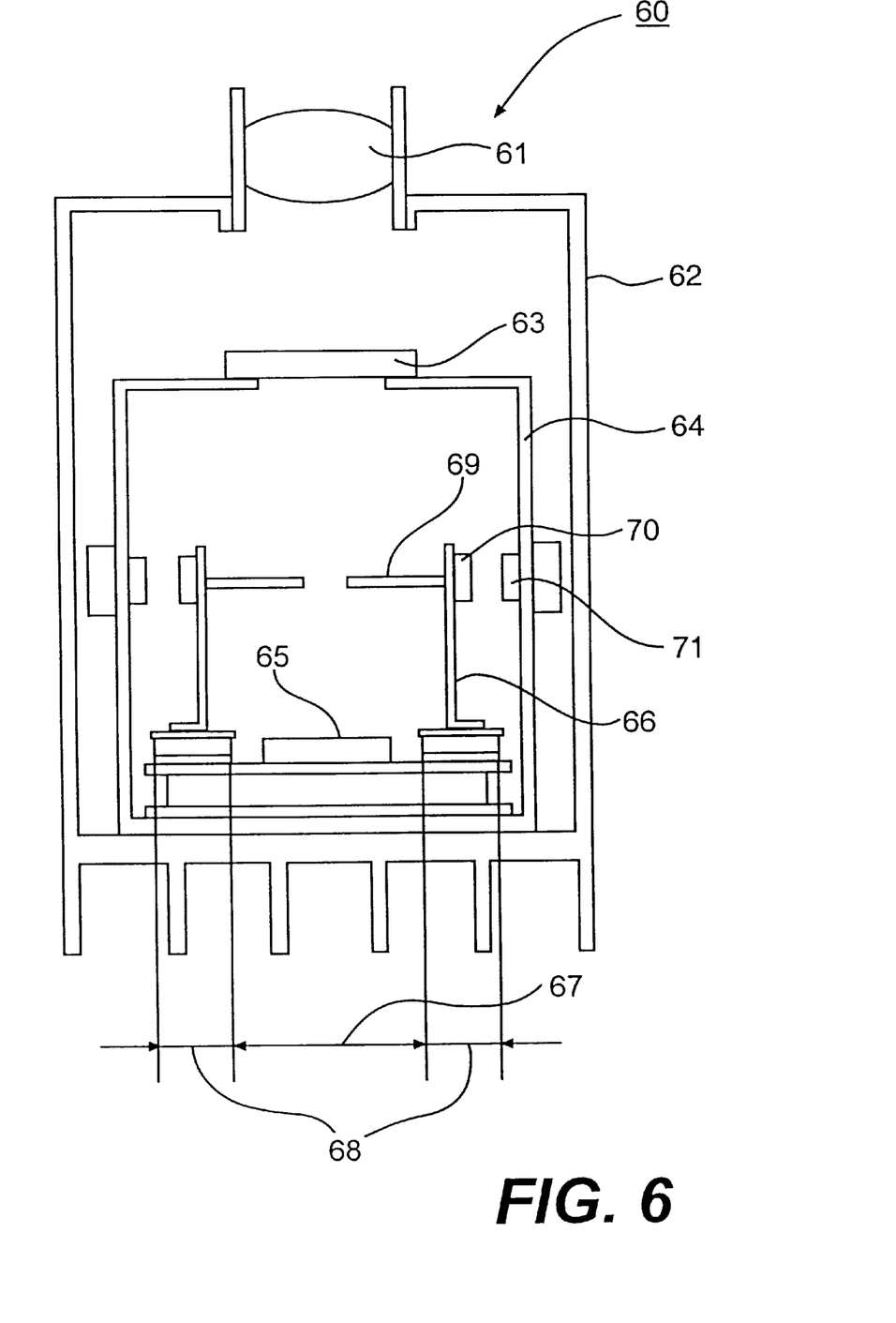
FIG. 6 is a schematic sectional view of a thermal infrared camera of a sixth preferred embodiment.

FIG. 6 is a schematic sectional diagram of a thermal infrared camera 60 according to a sixth preferred embodiment of the present invention. The sixth embodiment is similar to the second embodiment in having a housing 62 with a lens 61, a vacuum vessel 64 with an infrared radiation transmission window 63, a thermal infrared image pickup element 65, an infrared radiation blocking body 66, a first temperature control means 67 for controlling a temperature of the pickup element 65, and a second temperature control means 68 for controlling a temperature of the infrared radiation blocking body 66.

The thermal infrared camera 60 of the sixth embodiment differs from the second embodiment in having an optically variable diaphragm 69 that is thermally coupled to the infrared radiation blocking body 66. A periphery of the optically variable diaphragm 69 is connected to the infrared radiation blocking body 66, and the amount of infrared radiation incident on the pickup element 65 can be adjusted.

An opening of the optically variable diaphragm 69 can be adjusted using opening control means 70 and 71. The opening control means 70 and 71 use electromagnetic coupling. However, it is also possible to control the optically variable diaphragm 69 with a mechanical action, such as a motor drive.

The optically variable diaphragm 69 is temperature-controlled by the second temperature control means 68 via the infrared radiation blocking body 66. Accordingly, the amount of infrared radiation radiated from the optically variable diaphragm 69 can be fixed. As a result, even if the ambient temperature varies, the fluctuation in the background light can be reduced, and stable imaging can be achieved.

The thermal infrared camera 60 of the sixth preferred embodiment does not use aperture matching. However, if the lens 61 is aperture-matched to the pickup element 65, a field of view of the pickup element 65 can be maximized.

Furthermore, the term "optically variable diaphragm" refers to a mechanism that is installed in a light path and controls the amount of light passing through, e.g., a diaphragm mechanism whose opening size can be varied. Like the ND filter 59, the optically variable diaphragm 69 is used for observing high temperatures objects.

The present invention has a number of advantages. The fluctuation in the background light can be reduced even if the ambient temperature should vary, so that the ambient temperature stability can be improved. Accordingly, stable images can be obtained even if the ambient temperature varies.

Here, for the sake of simplicity of description, the system is described in terms of aperture matching with the image pickup element 65. However, if a so-called baffle structure is formed having projecting parts inside the infrared radiation blocking body 66, it is sufficient if the aperture matching is accomplished in this area. If the pickup element 65 has a variable diaphragm means, it is sufficient if aperture matching with the optically variable diaphragm 69 is effected.

In a thermal infrared camera 60, it is desirable that the image-focusing optical system be aperture-matched with the infrared radiation blocking body 66 with the pickup element 65 is effected. Here, "aperture matching is effected" means that in all light receiving elements (pixels) of an image area of the pickup element 65, the field of view observed from each of the light-receiving elements includes only the temperature-controlled infrared radiation blocking body 66 and the image-focusing optical system. When the aperture matching is effected, the infrared radiation incident on the image area includes only the background light from the temperature-controlled infrared radiation blocking body 66 and the infrared radiation incident from the image-focusing optical system. Accordingly, fluctuations in the background light are reduced, and the ambient temperature dependence of the thermal infrared camera 60 is further reduced. Furthermore, eclipsing does not occur, so that the field of view of the pickup element 65 is maximized.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A thermal infrared camera comprising:

a thermal infrared image pickup element having a plurality of light-receiving parts generating heat in response to incident infrared radiation, wherein the incident infrared radiation is detected using changes in electrical characteristics of each of the plurality of light-receiving parts;

an image-focusing optical system used for image pickup; and a temperature-controlled infrared radiation blocking body having an opening for conducting infrared radiation from the image-focusing optical system to the thermal infrared image pickup element, the temperature-controlled infrared radiation blocking body being positioned around the thermal infrared image pickup element, wherein the thermal infrared image pickup element is mounted on a first temperature control means used to control a temperature of the thermal infrared image pickup element, and wherein the temperature-controlled infrared radiation blocking body is thermally coupled to a second temperature control means having a different temperature from the first temperature control means.

2. The thermal infrared camera of claim 1, wherein the temperature-controlled infrared radiation blocking body is thermally coupled to the first temperature control means.

3. The thermal infrared camera of claim 1, wherein the temperature-controlled infrared radiation blocking body has a lower temperature than the thermal infrared image pickup element as a result of the second temperature control means being controlled to a lower temperature than the first temperature control means.

4. The thermal infrared camera of claim 1, wherein a wavelength-limiting filter is thermally coupled with the temperature-controlled infrared radiation blocking body and is positioned on a side of the temperature-controlled infrared radiation blocking body facing the thermal infrared image pickup element.

5. The thermal infrared camera of claim 1, wherein a neutral density filter is thermally coupled with the temperature-controlled infrared radiation blocking body and is positioned on a side of the temperature-controlled infrared radiation blocking body facing the thermal infrared image pickup element.

6. The thermal infrared camera of claim 1, wherein the image-focusing optical system is aperture-matched to the thermal infrared image pickup element.

7. The thermal infrared camera of claim 1, wherein the temperature-controlled infrared radiation blocking body and the thermal infrared image pickup element are inside one vacuum vessel.

8. A thermal infrared camera comprising:

a thermal infrared image pickup element having a plurality of light-receiving parts generating heat in response to incident infrared radiation, wherein the incident infrared radiation is detected using changes in electrical characteristics of each of the plurality of light-receiving parts;

an image-focusing optical system used for image pickup; and a temperature-controlled infrared radiation blocking body having an opening for conducting infrared radiation from the image-focusing optical system to the thermal infrared image pickup element, the temperature-controlled infrared radiation blocking body being positioned around the thermal infrared image pickup element, wherein the thermal infrared image pickup element is mounted on a first temperature control means used to control a temperature of the thermal infrared image pickup element, and wherein an optically variable diaphragm is thermally coupled with the temperature-controlled infrared radiation blocking body and is positioned on an infrared radiation incident side of the thermal infrared image pickup element.

9. A thermal infrared camera comprising:

a housing;

a vacuum vessel positioned inside the housing and enclosing a thermal infrared image pickup element and an infrared radiation blocking body, wherein the infrared radiation blocking body partially encloses the thermal infrared image pickup element;

an optical imaging system for projecting an image onto the thermal infrared image pickup element; and a temperature control element for controlling a temperature of the thermal infrared image pickup element in response to a temperature detector positioned near the thermal infrared image pickup element, wherein the temperature control element includes a plurality of Peltier elements, and wherein the infrared radiation blocking body is controlled to a different temperature from the thermal infrared image pickup element.

10. The thermal infrared camera of claim 9, further including an optical filter positioned between the optical imaging system and the thermal infrared image pickup element.

11. The thermal infrared camera of claim 9, wherein the optical filter includes at least one of a neutral density filter, a low-pass filter, a band-pass filter, and a high-pass filter.

12. The thermal infrared camera of claim 9, wherein the optical filter is thermally coupled to the infrared radiation blocking body.

13. The thermal infrared camera of claim 9, wherein each of the plurality of Peltier elements includes a different number of stages.

14. The thermal infrared camera of claim 9, wherein the thermal infrared image pickup element includes a plurality of light detectors.

15. The thermal infrared camera of claim 14, wherein each of the plurality of light detectors is one of a capacitive type pickup, a ferroelectric type pickup, a pyroelectric type pickup, or a thermistor type pickup.

16. The thermal infrared camera of claim 9, wherein the optical imaging system includes a lens.

17. The thermal infrared camera of claim 9, wherein the optical imaging system is aperture-matched to the thermal infrared image pickup element.

18. The thermal infrared camera of claim 9, wherein the temperature control element includes a Peltier element.

19. The thermal infrared camera of claim 9, wherein the thermal infrared image pickup element outputs an electrical signal in response to incident infrared radiation.

20. A thermal infrared camera comprising:

a housing;

a vacuum vessel positioned inside the housing and enclosing a thermal infrared image pickup element and an infrared radiation blocking body, wherein the infrared radiation blocking body partially encloses the thermal infrared image pickup element;

an optical imaging system for projecting an image onto the thermal infrared image pickup element;

a temperature control element for controlling a temperature of the thermal infrared image pickup element in response to a temperature detector positioned near the thermal infrared image pickup element, and a variable diaphragm positioned between the optical imaging system and the thermal infrared image pickup element.

21. The thermal infrared camera of claim 20, wherein the variable diaphragm is thermally coupled to the infrared radiation blocking body.

22. A thermal infrared camera comprising:

a housing;

a vacuum vessel positioned inside the housing and enclosing a thermal infrared image pickup element and an infrared radiation blocking body, wherein the infrared radiation blocking body partially encloses the thermal infrared image pickup element;

an optical imaging system for projecting an image onto the thermal infrared image pickup element; and a temperature control element for separately controlling a temperature of the thermal infrared image pickup element and of the infrared radiation blocking body in response to a temperature detector positioned near the thermal infrared image pickup element, wherein the optical imaging system is aperture matched to the thermal infrared pickup element.

23. A thermal infrared camera comprising:

a housing;

a vacuum vessel positioned inside the housing and enclosing a thermal infrared image pickup element and an infrared radiation blocking body, wherein the infrared radiation blocking body partially encloses the thermal infrared image pickup element;

an optical imaging system for projecting an image onto the thermal infrared image pickup element; and a first temperature control element for controlling a temperature of the thermal infrared image pickup element in response to a temperature detector positioned near the thermal infrared image pickup element; and a second temperature control element for controlling a temperature of the infrared radiation blocking body.

24. A thermal infrared camera comprising:

a housing;

a vacuum vessel positioned inside the housing and enclosing a thermal infrared image pickup element and an infrared radiation blocking body, wherein the infrared radiation blocking body partially encloses the thermal infrared image pickup element;

an optical imaging system for projecting an image onto the thermal infrared image pickup element;

a first Peltier element for controlling a temperature of the thermal infrared image pickup element in response to a temperature detector positioned near the thermal infrared image pickup element; and a second Peltier element for controlling a temperature of the infrared radiation blocking body, wherein portions of the second Peltier element are installed over the first Peltier element, and wherein the optical imaging system is aperture matched to the thermal infrared pickup element.

25. A thermal infrared camera comprising:

a housing;

a vacuum vessel positioned inside the housing and enclosing a thermal infrared image pickup element and an infrared radiation blocking body having extensions for blocking stray light, wherein the infrared radiation blocking body partially encloses the thermal infrared image pickup element;

an optical imaging system for projecting an image onto the thermal infrared image pickup element;

a first Peltier element for controlling a temperature of the thermal infrared image pickup element in response to a temperature detector positioned near the thermal infrared image pickup element; and a second Peltier element for controlling a temperature of the infrared radiation blocking body, wherein portions of the second Peltier element are installed over the first Peltier element.

26. A thermal infrared camera comprising:

a housing;

a vacuum vessel positioned inside the housing and enclosing a thermal infrared image pickup element and an infrared radiation blocking body, wherein the infrared radiation blocking body partially encloses the thermal infrared image pickup element;

an optical imaging system for projecting an image onto the thermal infrared image pickup element; and a temperature control element for separately controlling a temperature of the thermal infrared image pickup element and of the infrared radiation blocking body in response to a temperature detector positioned near the thermal infrared image pickup element; and an optical filter positioned between the optical imaging system and the thermal infrared image pickup element, the optical filter including at least one of a neutral density filter, a low-pass filter, a band-pass filter, and a high-pass filter, wherein the optical filter is thermally coupled to the infrared radiation blocking body.

27. A thermal infrared camera comprising:

a housing;

a vacuum vessel positioned inside the housing and enclosing a thermal infrared image pickup element and an infrared radiation blocking body, wherein the infrared radiation blocking body partially encloses the thermal infrared image pickup element;

an optical imaging system for projecting an image onto the thermal infrared image pickup element; and a temperature control element for controlling a temperature of the thermal infrared image pickup element and of the infrared radiation blocking body in response to a temperature detector positioned near the thermal infrared image pickup element; and a variable diaphragm positioned between the optical imaging system and the thermal infrared image pickup element, wherein the variable diaphragm is thermally coupled to the infrared radiation blocking body, and wherein the optical imaging system is aperture matched to the thermal infrared pickup element.

28. A thermal infrared camera comprising:

a housing;

a vacuum vessel positioned inside the housing and enclosing a thermal infrared image pickup element and an infrared radiation blocking body, wherein the infrared radiation blocking body partially encloses the thermal infrared image pickup element;

an optical imaging system for projecting an image onto the thermal infrared image pickup element;

a temperature control element for controlling a temperature of the thermal infrared image pickup element and the infrared radiation blocking body in response to a temperature detector positioned near the thermal infrared image pickup element;

an optical filter positioned between the optical imaging system and the thermal infrared image pickup element, the optical filter including at least one of a neutral density filter, a low-pass filter, a band-pass filter, and a high-pass filter, wherein the optical filter is thermally coupled to the infrared radiation blocking body; and a variable diaphragm positioned between the optical imaging system and the thermal infrared image pickup element, wherein the variable diaphragm is thermally coupled to the infrared radiation blocking body, wherein the temperature control element includes a plurality of Peltier elements, wherein each of the plurality of Peltier elements includes a different number of stages, and wherein the infrared radiation blocking body is controlled to a different temperature from the thermal infrared image pickup element.

* * * * *